United States Patent
Ma

(10) Patent No.: US 9,823,504 B2
(45) Date of Patent: Nov. 21, 2017

(54) METHOD FOR MANUFACTURING PDLC DISPLAY DEVICE COMPRISING QUANTUM DOTS AND A PDLC AND GRAPHENE MIXTURE AND PDLC DISPLAY DEVICE HAVING THE SAME

(71) Applicant: Shenzhen China Star Optoelectronics Technology Co., Ltd., Shenzhen (CN)

(72) Inventor: Chao Ma, Shenzhen (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 168 days.

(21) Appl. No.: 14/914,642

(22) PCT Filed: Dec. 24, 2015

(86) PCT No.: PCT/CN2015/098640
§ 371 (c)(1),
(2) Date: Feb. 26, 2016

(87) PCT Pub. No.: WO2017/080036
PCT Pub. Date: May 18, 2017

(65) Prior Publication Data
US 2017/0261780 A1 Sep. 14, 2017

(30) Foreign Application Priority Data
Nov. 9, 2015 (CN) .......................... 2015 1 0756204

(51) Int. Cl.
*G02F 1/1334* (2006.01)
*G02F 1/1335* (2006.01)
(Continued)

(52) U.S. Cl.
CPC .......... *G02F 1/1334* (2013.01); *G02F 1/1341* (2013.01); *G02F 1/1368* (2013.01);
(Continued)

(58) Field of Classification Search
CPC ......... G02F 1/133621; G02F 2201/121; G02F 2202/36; G02F 2001/13415; G02F 1/13337; G02F 2001/133614
See application file for complete search history.

(56) References Cited

U.S. PATENT DOCUMENTS

| | | | |
|---|---|---|---|
| 2004/0189893 A1* | 9/2004 | Choi | G02F 1/1334 349/86 |
| 2010/0208172 A1* | 8/2010 | Jang | B82Y 20/00 349/71 |

(Continued)

*Primary Examiner* — Paul Lee
(74) *Attorney, Agent, or Firm* — Leong C. Lei

(57) ABSTRACT

The present invention provides a method for manufacturing a PDLC display device and a PDLC display device. The method for manufacturing a PDLC display device according to the present invention includes mixing PDLC with graphene nanoparticles to improve the response speed of the PDLC and reduce a driving voltage of the PDLC, and also combines QDs to make a novel high color saturation display device, which requires no alignment layer and polarizer, providing a simple manufacturing process, showing an innovated and unique displaying effect, demonstrating at least four displaying modes of red, green, blue, and indistinctness, and overcoming light leakage of pixels and color mixture occurring in an existing PDLC display device. The PDLC display device according to the present invention includes a PLDC substrate, an array substrate, and a QD substrate, having a simple structure, showing an innovated and unique displaying effect, demonstrating at least four displaying modes of red, green, blue, and indistinctness, and overcoming light leakage of pixels and color mixture occurring in an existing PDLC display device.

14 Claims, 7 Drawing Sheets

(51) Int. Cl.
*G02F 1/1368* (2006.01)
*G02F 1/1343* (2006.01)
*G02F 1/1333* (2006.01)
*G02F 1/1341* (2006.01)

(52) U.S. Cl.
CPC .... *G02F 1/13439* (2013.01); *G02F 1/133377* (2013.01); *G02F 1/133512* (2013.01); *G02F 1/133514* (2013.01); *G02F 1/133621* (2013.01); *G02F 1/134309* (2013.01); *G02F 2001/13415* (2013.01); *G02F 2001/133614* (2013.01); *G02F 2201/121* (2013.01); *G02F 2201/123* (2013.01); *G02F 2202/36* (2013.01)

(56) References Cited

U.S. PATENT DOCUMENTS

| | | | | |
|---|---|---|---|---|
| 2011/0216271 A1* | 9/2011 | Suzuki | ................ | G02F 1/13362 349/71 |
| 2012/0274882 A1* | 11/2012 | Jung | ................ | G02F 1/133617 349/96 |
| 2012/0320298 A1* | 12/2012 | Suzuki | .............. | G02F 1/133553 349/43 |
| 2013/0120678 A1* | 5/2013 | Chao | ........................ | G02F 1/01 349/34 |
| 2014/0240642 A1* | 8/2014 | Furukawa | .......... | H05B 33/0857 349/65 |
| 2015/0301408 A1* | 10/2015 | Li | .................... | G02F 1/133621 362/84 |

\* cited by examiner

METHOD FOR MANUFACTURING PDLC DISPLAY DEVICE COMPRISING QUANTUM DOTS AND A PDLC AND GRAPHENE MIXTURE AND PDLC DISPLAY DEVICE HAVING THE SAME

BACKGROUND OF THE INVENTION

1. Field of the Invention

The present invention relates to the field of display technology, and in particular to a method for manufacturing a polymer dispersed liquid crystal (PDLC) display device and a PDLC display device.

2. The Related Arts

A thin-film transistor liquid crystal display (TFT-LCD) generally comprises a color filter (CF) substrate and a thin-film transistor (TFT) substrate. The substrates have inside surfaces facing each other and comprising transparent electrodes provided thereon. A layer of liquid crystal is interposed between the two substrates. The liquid crystal display controls the orientation of liquid crystal molecules through application of an electric field in order to change the state of polarization of light and selectively blocks or passes a light path by means of polarizers so as to achieve the purpose of displaying.

It can be said that for almost all sizes of display devices, including large, medium, and small sizes, the LCDs take an absolutely predominant share of the market. In today's LCD market of applications, an increasing demand is emerging for terminal displays used in large shopping malls, supermarkets, hotel lobbies, theaters and cinemas, education, medication, and other public sites where people crowd and the yearly increasing rate is 30%.

On the other hand, polymer dispersed liquid crystal (PDLC), serving as a liquid crystal light regulation valve, has been paid close attention to and widely used in recent years and is a material that is formed by mixing low molecule liquid crystal and pre-polymer to generate a polymerization reaction under certain conditions so as to form micrometer-size liquid crystal droplets uniformly dispersed in a high-molecule polymer network and exhibits characteristics of electro-optic response by means of anisotropic dielectric property of the liquid crystal molecules for being operable between a scattering state and a transmission state and demonstrating a predetermined grey level. A PDLC display device offers various advantages, such as omitting the use of polarizers and alignment layers, being easy to manufacture, being easy to make a large-sized flexible display device, and has been widely used in optic modulators, thermal-sensitive and pressure-sensitive devices, electrically-controlled glass, light valves, projection displaying, and electronic books. The operation principle is that no regular electric field can be established between films without an external voltage applied and optic axes of liquid crystal droplets are oriented stochastically, demonstrating a disorderly condition, so that effective refractive index n0 does not match refractive index np of the polymer. Incident light would be strongly scattered so that the film shows an opaque or translucent condition. When an external voltage is applied, the optical axes of the liquid crystal drops are aligned in a direction normal to a surface of the film, meaning being consistent with the direction of the electric field. Ordinary refractive index of the droplets and the refractive index of the polymer generally match each other so that there is no apparent interface therebetween thereby forming a generally homogeneous medium, and thus, no scattering will happen to incident light and the film demonstrates a transparent condition. Thus, in a condition of being driven by an external electric field, PDLC exhibits the characteristics of being a light switch and the degree of transparency is increased according to a predetermined curve when the applied voltage is increased.

In addition, quantum dots, as a newly emerging material for display devices, have been widely accepted and paid close attention to. Quantum dots are a quasi-zero-dimensional nanometer-sized material and are generally formed of a small amount of atoms. Roughly speaking, a quantum dot has a size that is less than 100 nm in each of the three dimensions and shows an external appearance as an extremely small dot-like article with movement of an internal electron thereof being confined in each direction so as to exhibit a significant quantum confinement effect. The quantum dot shows an excitation spectrum that is wide and distributed continuously and an emission spectrum that is narrow and symmetric, providing various advantages, including color controllability, high photochemistry stability, and extended fluorescent life time, thereby making it an ideal luminescent material. Currently, quantum dots are classified as two types according to the ways of energy acquisition, one being photoluminescence and the other electroluminescence. The color of light emitting from a quantum dot is achieved with the size effect of the quantum dot, namely controlling the shape, structure, and size of the quantum dot to control the electron states of energy band gap, magnitude of exciton bonding energy, and exciton energy blue shifting.

Further, graphene has also started to play a role of application in TFT-LCDs and is an important milestone scientific discovery in the field after fullerenes and carbon nanotubes. Graphene is a two-dimensional crystal composed of a single carbon layer formed of carbon atom connected though sp hybridization, having a basic structure unit comprising benzene six-member ring that is the most stable structure of the organic materials. An electron, when moving in the orbit of graphene, does not undergo scattering caused by lattice defects or foreign atoms. Due to the presence of π-orbit in the plane of the graphene sheet, electrons are allowed to move freely in the crystal so that the graphene possesses excellent electron transportation characteristics. It also shows various unique properties, such as zero energy gap, extraordinary quantum Hall effect, and Landau quantum behavior, so as to increasingly attract the attention of people involved in the flat panel display industry for research and study of the application thereof.

SUMMARY OF THE INVENTION

An object of the present invention is to provide a method for manufacturing a polymer dispersed liquid crystal (PDLC) display device, which improves the response speed of the PDLC and reduces a driving voltage of the PDLC to overcome the phenomena of pixel light leakage and color mixture existing in a conventional PDLC display device.

Another object of the present invention is to provide a PDLC display device, which demonstrates at least four displaying modes of red, green, blue, and indistinctness, wherein the PDLC has a high response speed and a low driving voltage so as to overcome the phenomena of pixel light leakage and color mixture existing in a conventional PDLC display device.

To achieve the above objects, the present invention provides a method for manufacturing a PDLC display device, which comprises the following steps:

(1) providing PDLC and graphene nanoparticles and mixing the graphene nanoparticles and the PDLC at a mass ratio of 0.1-20:100, followed by uniform stirring to obtain a PDLC and graphene mixture;

(2) providing a first base plate, coating a black matrix material on the first base plate, and subjecting the black matrix material to a patterning operation to form a black matrix, wherein the first base plate and the black matrix collectively delimit a plurality of pixel cavities;

(3) forming a common electrode on and completely covering the black matrix, the plurality of pixel cavities, and the first base plate; and dropping the PDLC and graphene mixture into the plurality of pixel cavities at predetermined sites to form a PDLC substrate;

(4) providing a second base plate and forming, in sequence, a TFT layer and a pixel electrode on the second base plate to form an array substrate, wherein the pixel electrode layer comprises a plurality of pixel electrodes respectively corresponding to the plurality of pixel cavities;

(5) coating first enclosure resin along a circumference of the PDLC substrate or the array substrate and conducting vacuum lamination of the PDLC substrate and the array substrate;

(6) providing a third base plate and forming a plurality of pixel patterns on the base plate to respectively correspond to the plurality of pixel cavities, wherein the plurality of pixel patterns comprises red pixel patterns, green pixel patterns, and transparent pixel patterns; the red pixel patterns is formed of a material comprising a mixture of red QDs and a transparent photoresist material; the green pixel patterns is formed of a material comprising a mixture of green QDs and a transparent photoresist material; and the transparent pixel patterns includes no material provided thereon, so as to form a QD substrate, wherein the red pixel patterns and the green pixel patterns, when excited by blue light, emit red light and green light respectively and the transparent pixel patterns allow blue light to transmit therethrough to display a blue color;

(7) coating second enclosure resin along a circumference of the array substrate or the QD substrate and conducting lamination of the array substrate and the QD substrate such that the PDLC substrate, the array substrate, and the QD substrate collectively form a PDLC display panel; and (8) providing a backlight module and combining the PDLC display panel and the backlight module together to form a PDLC display device, wherein the backlight module emits blue light.

In step (1), the PDLC and the graphene nanoparticles are mixed through mechanical stirring.

In step (1), the graphene nanoparticles are formed through one of mechanical exfoliation, oxidation-reduction operation, silicon carbide epitaxial growth, and chemical vapor deposition; and the graphene nanoparticles have a particle size in the range of 0 nm-80 nm.

In step (1), the graphene nanoparticles and the PDLC are mixed at a mass ratio of 0.1-5:100.

The common electrode and the pixel electrode are both transparent electrodes; and the first base plate, the second base plate, and the third base plate are all transparent plates.

The first enclosure resin and the second enclosure resin contain therein spacing materials for maintaining a spacing distance between upper and lower substrates.

In step (6), a process for forming the red pixel patterns and the green pixel patterns is that the transparent photoresist material that is mixed with the QDs is coated on the third base plate, followed by operations of drying, exposure, development, and etching, wherein the QDs and the transparent photoresist material are mixed at a ratio of 5-10:100.

The present invention also provides a PDLC display device, which comprises a PDLC display panel and a backlight module arranged below the PDLC display panel;

wherein the PDLC display panel comprises a PDLC substrate, an array substrate arranged below the PDLC substrate, and a QD substrate arranged below the array substrate;

the PDLC substrate comprises a first base plate, a black matrix arranged on the first base plate, a common electrode arranged on the black matrix and the first base plate, a PDLC and graphene mixture; the black matrix and the first base plate collectively delimit a plurality of pixel cavities, and the plurality of pixel cavities is filled with the PDLC and graphene mixture;

the array substrate comprises a second base plate, a TFT layer arranged on the second base plate, and a pixel electrode layer arranged on the TFT layer; and the pixel electrode layer comprises a plurality of pixel electrodes respectively corresponding to the plurality of pixel cavities;

the QD substrate comprises a third base plate, a plurality of pixel patterns arranged on the third base plate and respectively corresponding to the plurality of pixel cavities, wherein the plurality of pixel patterns comprises red pixel patterns, green pixel patterns, and transparent pixel patterns; the red pixel patterns is formed of a material comprising a mixture of red QDs and a transparent photoresist material; the green pixel patterns is formed of a material comprising a mixture of green QDs and a transparent photoresist material; and the transparent pixel patterns includes no material provided thereon; and the backlight module emits blue light; and the red pixel patterns and the green pixel pattern are excitable by blue light to emit red light and green light respectively and the transparent pixel patterns allows blue light to transmit therethrough to thereby display a blue color.

The common electrode and the pixel electrode are both transparent electrodes.

The first base plate, the second base plate, and the third base plate are transparent plates.

The present invention further provides a method for manufacturing a PDLC display device, which comprises the following steps:

(1) providing PDLC and graphene nanoparticles and mixing the graphene nanoparticles and the PDLC at a mass ratio of 0.1-20:100, followed by uniform stirring to obtain a PDLC and graphene mixture;

(2) providing a first base plate, coating a black matrix material on the first base plate, and subjecting the black matrix material to a patterning operation to form a black matrix, wherein the first base plate and the black matrix collectively delimit a plurality of pixel cavities;

(3) forming a common electrode on and completely covering the black matrix, the plurality of pixel cavities, and the first base plate; and dropping the PDLC and graphene mixture into the plurality of pixel cavities at predetermined sites to form a PDLC substrate;

(4) providing a second base plate and forming, in sequence, a TFT layer and a pixel electrode on the second base plate to form an array substrate, wherein the pixel electrode layer comprises a plurality of pixel electrodes respectively corresponding to the plurality of pixel cavities;

(5) coating first enclosure resin along a circumference of the PDLC substrate or the array substrate and conducting vacuum lamination of the PDLC substrate and the array substrate;

(6) providing a third base plate and forming a plurality of pixel patterns on the base plate to respectively correspond to the plurality of pixel cavities, wherein the plurality of pixel patterns comprises red pixel patterns, green pixel patterns, and transparent pixel patterns; the red pixel patterns is formed of a material comprising a mixture of red QDs and a transparent photoresist material; the green pixel patterns is formed of a material comprising a mixture of green QDs and a transparent photoresist material; and the transparent pixel patterns includes no material provided thereon, so as to form a QD substrate, wherein the red pixel patterns and the green pixel patterns, when excited by blue light, emit red light and green light respectively and the transparent pixel patterns allow blue light to transmit therethrough to display a blue color;

(7) coating second enclosure resin along a circumference of the array substrate or the QD substrate and conducting lamination of the array substrate and the QD substrate such that the PDLC substrate, the array substrate, and the QD substrate collectively form a PDLC display panel; and (8) providing a backlight module and combining the PDLC display panel and the backlight module together to form a PDLC display device, wherein the backlight module emits blue light;

wherein in step (1), the PDLC and the graphene nanoparticles are mixed through mechanical stirring;

wherein in step (1), the graphene nanoparticles are formed through one of mechanical exfoliation, oxidation-reduction operation, silicon carbide epitaxial growth, and chemical vapor deposition; and the graphene nanoparticles have a particle size in the range of 0 nm-80 nm; and wherein in step (1), the graphene nanoparticles and the PDLC are mixed at a mass ratio of 0.1-5:100.

The efficacy of the present invention is that the present invention provides a method for manufacturing a PDLC display device, which comprises mixing PDLC with graphene nanoparticles to improve the response speed of the PDLC and reduce a driving voltage of the PDLC, and also combines QDs to make a novel high color saturation display device, which requires no alignment layer and polarizer, providing a simple manufacturing process, showing an innovated and unique displaying effect, demonstrating at least four displaying modes of red, green, blue, and indistinctness, and overcoming light leakage of pixels and color mixture occurring in an existing PDLC display device. The present invention provides a PDLC display device, which comprises a PLDC substrate, an array substrate, and a QD substrate, having a simple structure, showing an innovated and unique displaying effect, demonstrating at least four displaying modes of red, green, blue, and indistinctness, and overcoming light leakage of pixels and color mixture occurring in an existing PDLC display device.

BRIEF DESCRIPTION OF THE DRAWINGS

The technical solution, as well as other beneficial advantages, of the present invention will become apparent from the following detailed description of an embodiment of the present invention, with reference to the attached drawings.

In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
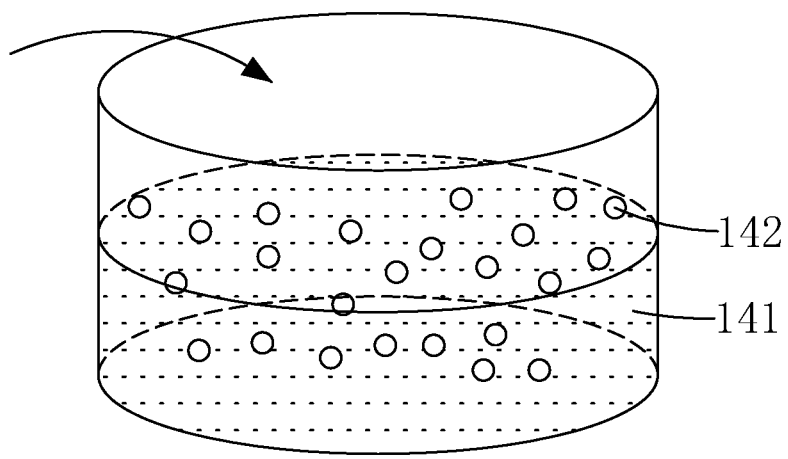
FIGS. 1 and 2 are schematic views illustrating step 1 of a method for manufacturing a polymer dispersed liquid crystal (PDLC) display device according to the present invention.
Figure 2:
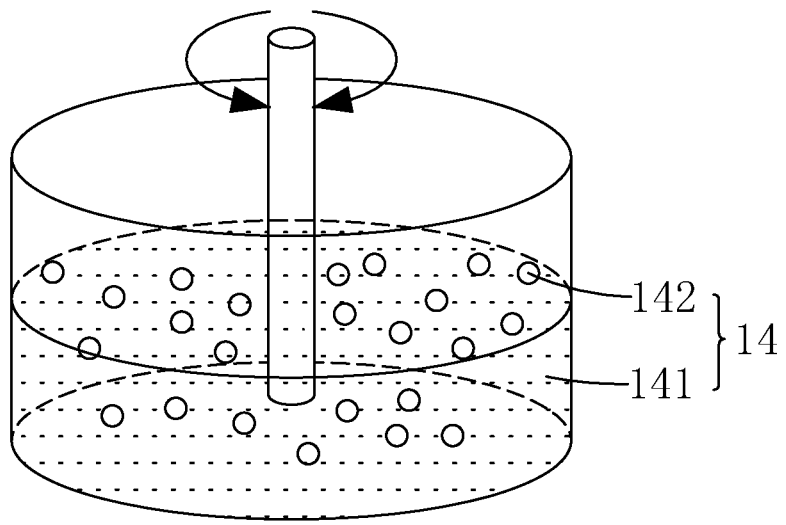

Firstly, the present invention provides a method for manufacturing a polymer dispersed liquid crystal (PDLC) display device, which comprises the following steps:

Step 1: as shown in FIGS. 1-2, providing PDLC 141 and graphene nanoparticles 142 and mixing the graphene nanoparticles 142 and the PDLC 141 at a mass ratio of 0.1-20:100, followed by uniform stirring to obtain a PDLC and graphene mixture 14.

Specifically, in Step 1, mechanical stirring is adopted to mix the PDLC 141 and the graphene nanoparticles 142.

Specifically, in Step 1, the graphene nanoparticles 142 are formed through mechanical exfoliation, oxidation-reduction operation, silicon carbide epitaxial growth, or chemical vapor deposition. The graphene nanoparticles 142 have a particle size in the range of 0 nm-80 nm.

Figure 3:
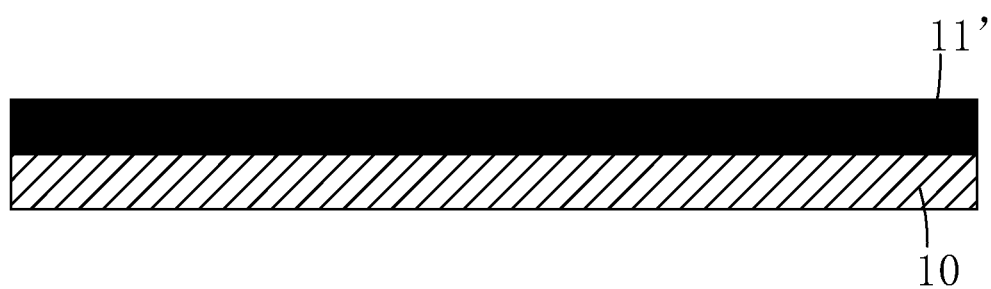
FIGS. 3 and 4 are schematic views illustrating step 2 of the method for manufacturing a PDLC display device according to the present invention.
Figure 4:
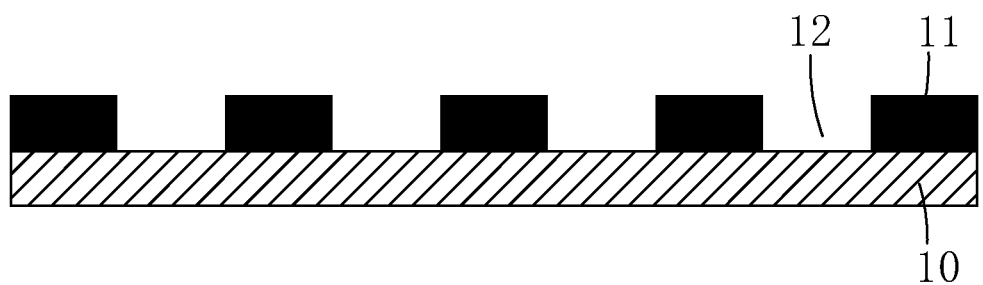

Preferably, the graphene nanoparticles 142 and the PDLC 141 are mixed at a mass ratio of 0.1-5:100;

Step 2: as shown in FIGS. 3-4, providing a first base plate 10, coating a black matrix material 11' on the first base plate 10, and subjecting the black matrix material 11' to a patterning operation to form a black matrix 11, wherein the first base plate 10 and the black matrix 11 collectively delimit a plurality of pixel cavities 12.

Figure 5:
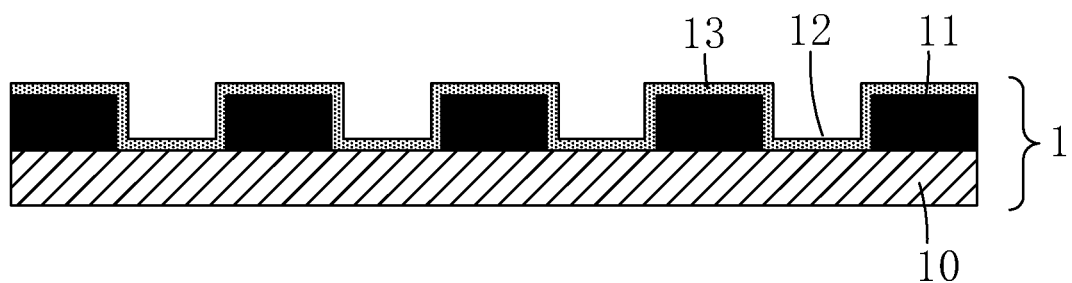
FIGS. 5 and 6 are schematic views illustrating step 3 of the method for manufacturing a PDLC display device according to the present invention.
Figure 6:
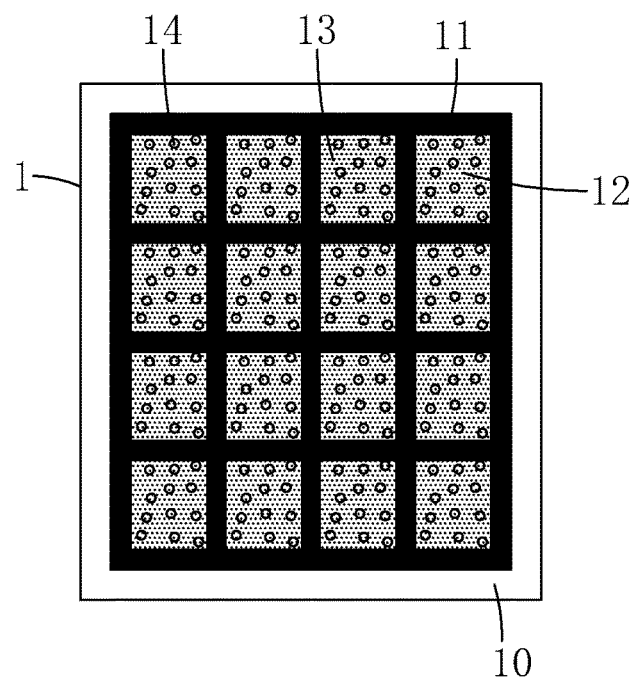

Step 3: as shown in FIG. 5, forming a common electrode 13 on and completely covering the black matrix 11, the plurality of pixel cavities 12, and the first base plate 10; and as shown in FIG. 6, dropping the PDLC and graphene mixture 14 into the plurality of pixel cavities 12 at predetermined sites to form a PDLC substrate 1.

Specifically, the common electrode 13 is a transparent electrode and in Step 3, the common electrode 13 is formed through sputtering; and preferably, the common electrode 13 is formed of a material comprising indium tin oxide (ITO) or indium zinc oxide (IZO).

Figure 7:
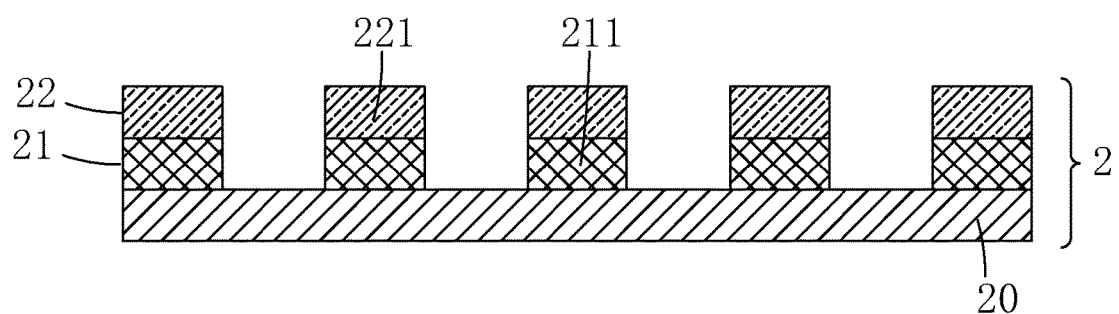
FIG. 7 is a schematic view illustrating step 4 of the method for manufacturing a PDLC display device according to the present invention.

Step 4: as shown in FIG. 7, providing a second base plate 20 and forming, in sequence, a thin-film transistor (TFT) layer 21 and a pixel electrode 22 on the second base plate 20 to form an array substrate 2, wherein the pixel electrode layer 22 comprises a plurality of pixel electrodes 221 respectively corresponding to the plurality of pixel cavities 12.

Specifically, the pixel electrodes 221 are transparent electrodes, and preferably, the pixel electrodes 221 are formed of a material comprising indium tin oxide (ITO) or indium zinc oxide (IZO).

Specifically, the thin-film transistor layer 21 comprises a plurality of TFTs 211 respectively corresponding to the plurality of pixel electrodes 221.

Figure 8:
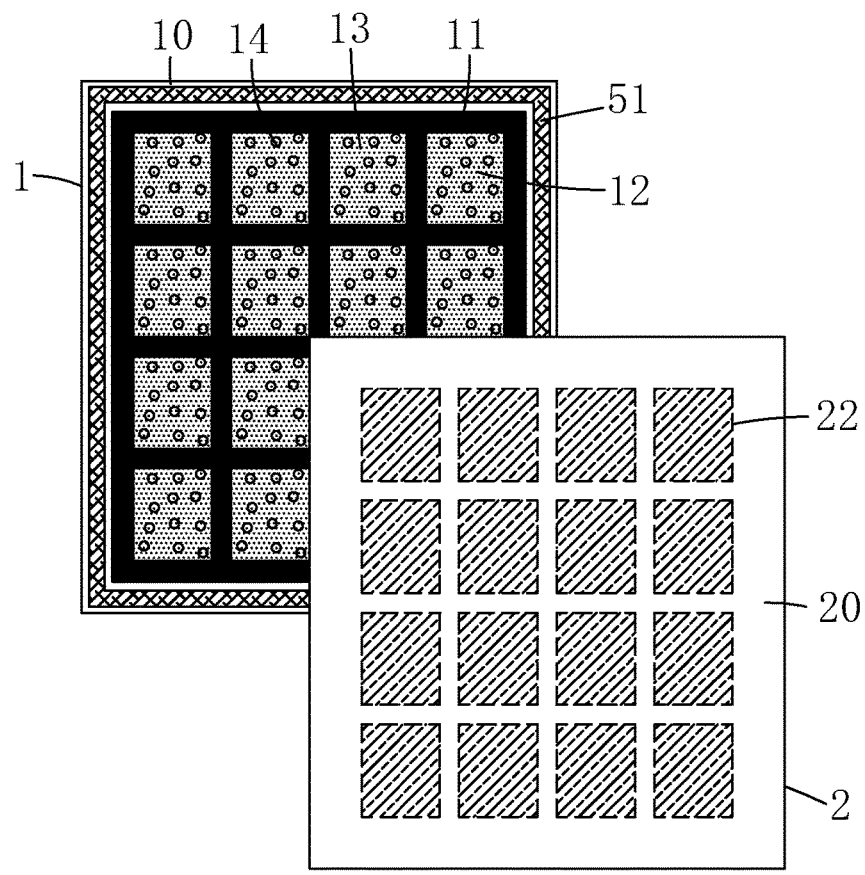
FIGS. 8 and 9 are schematic views illustrating step 5 of the method for manufacturing a PDLC display device according to the present invention.
Figure 9:
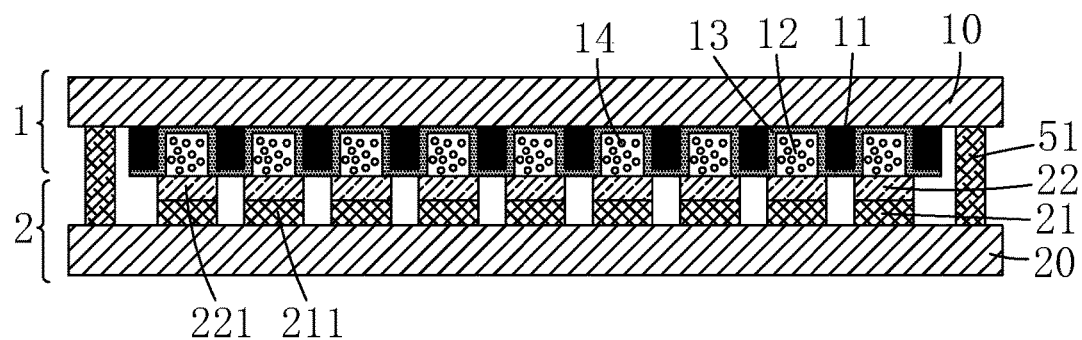

Step 5: as shown in FIGS. 8-9, coating first enclosure resin 51 along a circumference of the PDLC substrate 1 or the array substrate 2 and conducting vacuum lamination of the PDLC substrate 1 and the array substrate 20.

Figure 10:
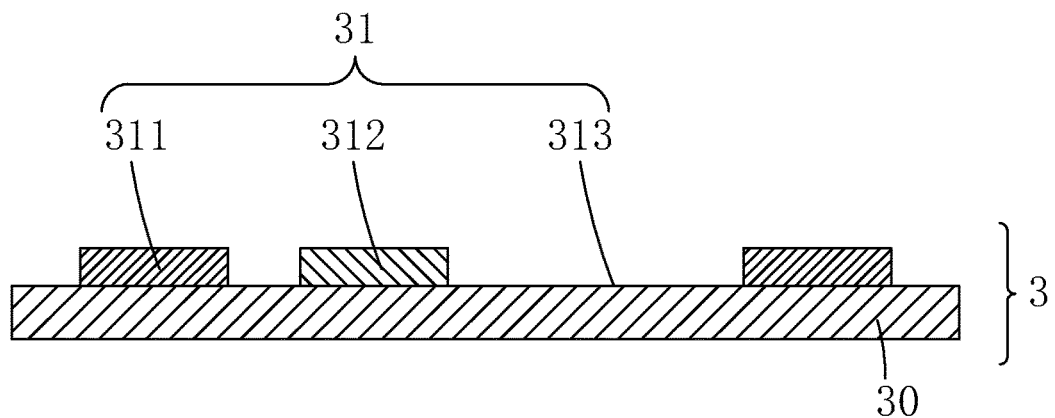
FIGS. 10 and 11 are schematic views illustrating step 6 of the method for manufacturing a PDLC display device according to the present invention.
Figure 11:
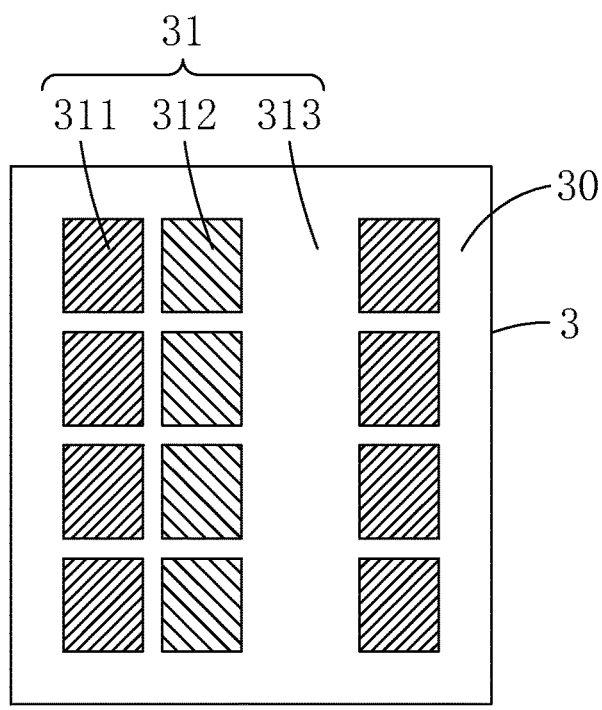

Step 6: as shown in FIGS. 10-11, providing a third base plate 30 and forming a plurality of pixel patterns 31 on the base plate 30 to respectively correspond to the plurality of pixel cavities 12, wherein the plurality of pixel patterns 31 comprises red pixel patterns 311, green pixel patterns 312, and transparent pixel patterns 313; the red pixel patterns 311 is formed of a material comprising a mixture of red quantum dots (QDs) and a transparent photoresist material; the green pixel patterns 312 is formed of a material comprising a mixture of green QDs and a transparent photoresist material; and the transparent pixel patterns 313 includes no material provided thereon, so as to form a QD substrate 3, wherein the red pixel patterns 311 and the green pixel patterns 312, when excited by blue light, emit red light and green light respectively and the transparent pixel patterns 313 allow blue light to transmit therethrough to display a blue color.

Specifically, in Step 6, a process adopted to form the red pixel patterns 311 and the green pixel patterns 312 is that the transparent photoresist material that is mixed with the QDs is coated on the third base plate 30, followed by operations of drying, exposure, development, and etching. Specifically, the QDs and the transparent photoresist material are mixed at a ratio of 5-10:100.

Further, the plurality of pixel patterns 31 may further comprise white pixel patterns, and the white pixel patterns are formed of a material that comprises a mixture of red QDs, green QDs, and a transparent photoresist material.

Further, the plurality of pixel patterns 31 may further comprise yellow pixel patterns, and the yellow pixel patterns are formed of a material that comprises a mixture of yellow QDs and a transparent photoresist material.

Figure 12:
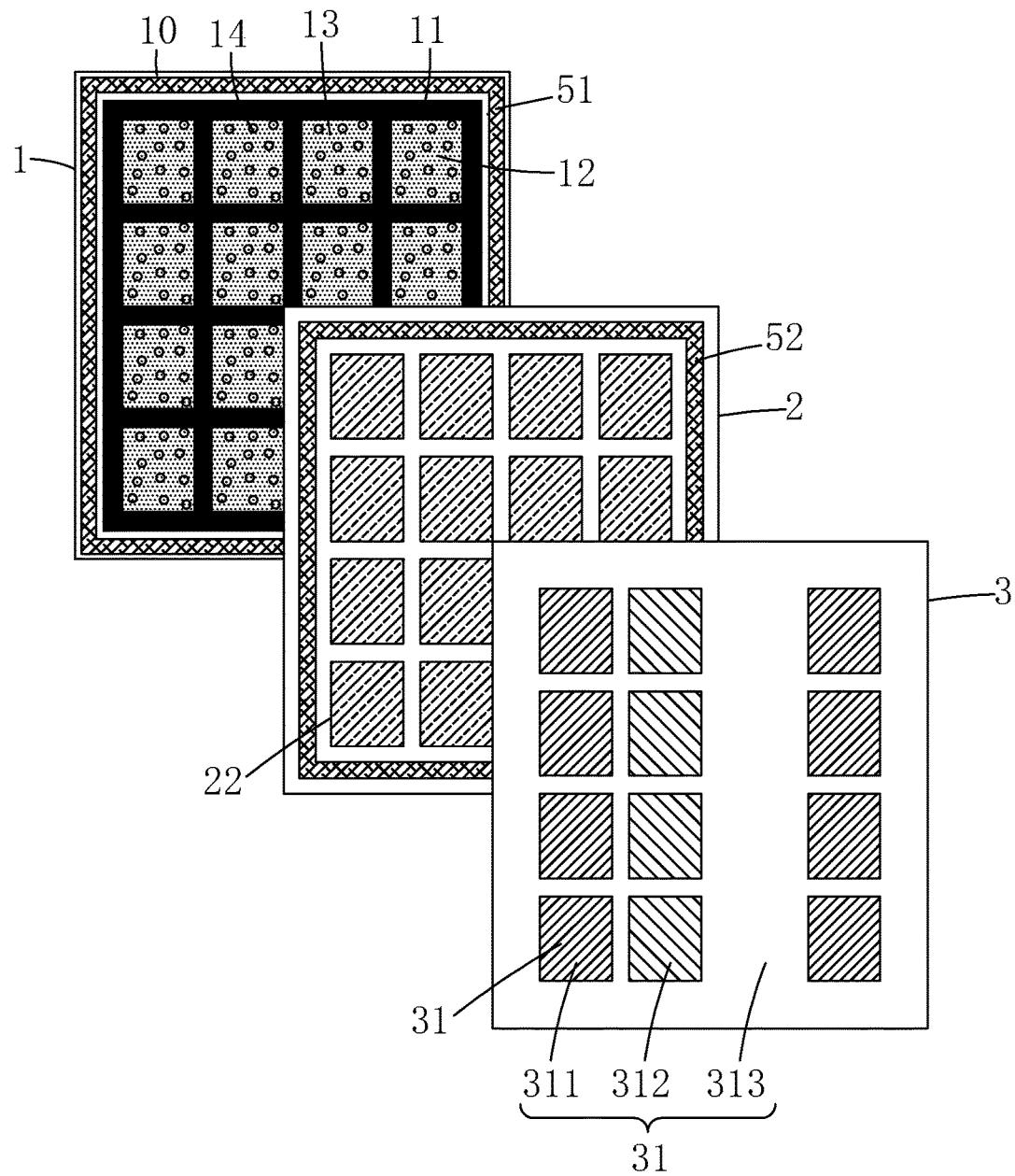
FIGS. 12 and 13 are schematic views illustrating step 7 of the method for manufacturing a PDLC display device according to the present invention.
Figure 13:
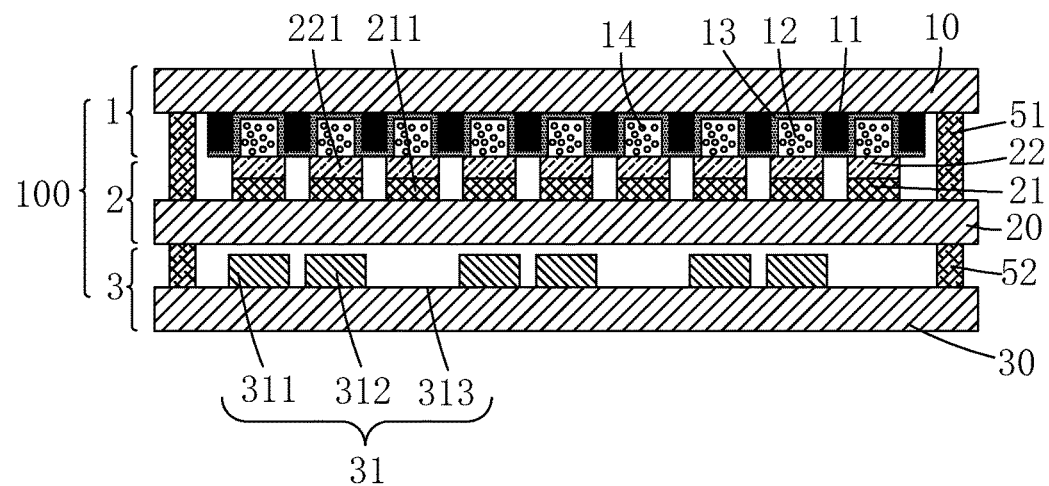

Step 7: as shown in FIGS. 12-13, coating second enclosure resin 52 along a circumference of the array substrate 2 or the QD substrate 3 and conducting lamination of the array substrate 2 and the QD substrate 3 such that, as shown in FIG. 12, the PDLC substrate 1, the array substrate 2, and the QD substrate 3 collectively form a PDLC display panel 100.

Figure 14:
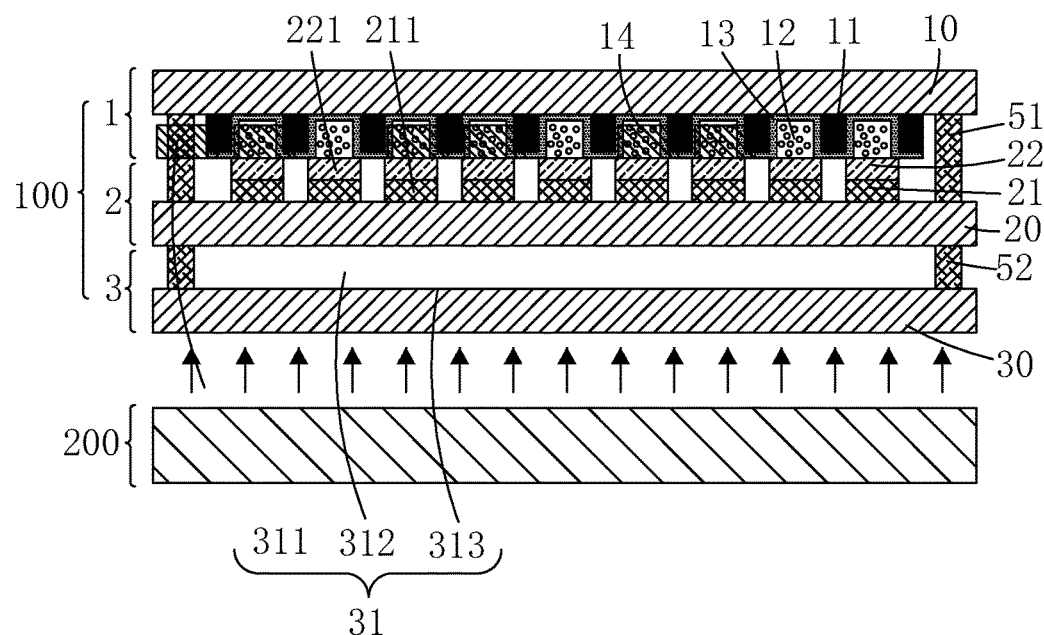
FIG. 14 is a schematic view illustrating step 8 of the method for manufacturing a PDLC display device according to the present invention and is also a schematic view illustrating a cross-sectional structure of a PDLC display device according to the present invention.

Step 8: as shown in FIG. 14, providing a backlight module 200 and combining the PDLC display panel 100 and the backlight module 200 together to form a PDLC display device, wherein the backlight module 200 emits blue light.

Specifically, the first enclosure resin 51 and the second enclosure resin 52 contain therein spacing materials for maintaining a spacing distance between upper and lower substrates.

Specifically, the first base plate 10, the second base plate 20, and the third base plate 30 are all transparent plates, and preferably, the first base plate 10, the second base plate 20, and the third base plate 30 are all glass plates.

The present invention provides a method for manufacturing a PDLC display device, which comprises mixing PDLC with graphene nanoparticles to improve the response speed of the PDLC and reduce a driving voltage of the PDLC, and also combines QDs to make a novel high color saturation display device, which requires no alignment layer and polarizer, providing a simple manufacturing process, showing an innovated and unique displaying effect, demonstrating at least four displaying modes of red, green, blue, and indistinctness, and overcoming light leakage of pixels and color mixture occurring in an existing PDLC display device.

Referring to FIG. 14, in combination with FIGS. 1-13, the present invention also provides a PDLC display device, which comprises a PDLC display panel 100 and a backlight module 200 arranged below the PDLC display panel 100.

Specifically, the PDLC display panel 100 comprises a PDLC substrate 1, an array substrate 2 arranged below the PDLC substrate 1, and a QD substrate 3 arranged below the array substrate 2.

Specifically, the PDLC substrate 1 comprises a first base plate 10, a black matrix 11 arranged on the first base plate 10, a common electrode 13 arranged on the black matrix 11 and the first base plate 10, a PDLC and graphene mixture 14; the black matrix 11 and the first base plate 10 collectively delimit a plurality of pixel cavities 12, and the plurality of pixel cavities 12 is filled with the PDLC and graphene mixture 14.

The array substrate 2 comprises a second base plate 20, a TFT layer 21 arranged on the second base plate 20, and a pixel electrode layer 22 arranged on the TFT layer 21; the pixel electrode layer 22 comprises a plurality of pixel electrodes 221 respectively corresponding to the plurality of pixel cavities 12.

Specifically, the QD substrate 3 comprises a third base plate 30, a plurality of pixel patterns 31 arranged on the third base plate 30 and respectively corresponding to the plurality of pixel cavities 12, wherein the plurality of pixel patterns 31 comprises red pixel patterns 311, green pixel patterns 312, and transparent pixel patterns 313; the red pixel patterns 311 is formed of a material comprising a mixture of red QDs and a transparent photoresist material; the green pixel patterns 312 is formed of a material comprising a mixture of green QDs and a transparent photoresist material; and the transparent pixel patterns 313 includes no material provided thereon.

Specifically, the backlight module 200 emits blue light and the red pixel patterns 311 and the green pixel patterns 312, when excited by blue light, emit red light and green light respectively; and the transparent pixel patterns 313 allows blue light to transmit therethrough to thereby display a blue color.

The plurality of pixel cavities 12 of the PDLC substrate 1 are each filled with the PDLC and graphene mixture 14 to form a plurality of liquid crystal cells. The liquid crystal cells can be driven in a manner similar to that of a conventional TFT-LCD. The PDLC and graphene mixture 14 contained in the liquid crystal cells is controlled by an electrical voltage applied between a common electrode 13 and the pixel electrode layer 22 to exhibit the characteristics of a light switch, wherein with no external voltage applied, the PDLC and graphene mixture 14 shows an opaque or translucent state, and when driven by an external electric field, the PDLC and graphene mixture 14 shows transparency having a degree that is increased along a predetermined curve when the applied voltage is increased Specifically, the common electrode 13 and the pixel electrode 221 are both transparent electrodes, and preferably, the common electrode 13 and the pixel electrode 221 are both formed of a material comprising indium tin oxide (ITO) or indium zinc oxide (IZO).

Specifically, the TFT layer 21 comprises a plurality of TFTs 211 respectively corresponding to the plurality of pixel electrodes 221.

Specifically, the first base plate 10, the second base plate 20, and the third base plate 30 are all transparent plates, and preferably, the first base plate 10, the second base plate 20, and the third plate 30 are all glass plates.

Further, the plurality of pixel patterns 31 may further comprise white pixel patterns, and the white pixel patterns are formed of a material that comprises a mixture of red QDs, green QDs, and a transparent photoresist material.

Further, the plurality of pixel patterns 31 may further comprise yellow pixel patterns, and the yellow pixel patterns are formed of a material that comprises a mixture of yellow QDs and a transparent photoresist material.

The present invention provides a PDLC display device, which comprises a PLDC substrate, an array substrate, and a QD substrate, having a simple structure, showing an innovated and unique displaying effect, demonstrating at least four displaying modes of red, green, blue, and indistinctness, and overcoming light leakage of pixels and color mixture occurring in an existing PDLC display device.

In summary, the present invention provides a method for manufacturing a PDLC display device, which comprises mixing PDLC with graphene nanoparticles to improve the response speed of the PDLC and reduce a driving voltage of the PDLC, and also combines QDs to make a novel high color saturation display device, which requires no alignment layer and polarizer, providing a simple manufacturing process, showing an innovated and unique displaying effect, demonstrating at least four displaying modes of red, green, blue, and indistinctness, and overcoming light leakage of pixels and color mixture occurring in an existing PDLC display device. The present invention provides a PDLC display device, which comprises a PLDC substrate, an array substrate, and a QD substrate, having a simple structure, showing an innovated and unique displaying effect, demonstrating at least four displaying modes of red, green, blue, and indistinctness, and overcoming light leakage of pixels and color mixture occurring in an existing PDLC display device.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for manufacturing a polymer dispersed liquid crystal (PDLC) display device, comprising the following steps:
   (1) providing PDLC and graphene nanoparticles and mixing the graphene nanoparticles and the PDLC at a mass ratio of 0.1-20:100, followed by uniform stirring to obtain a PDLC and graphene mixture;
   (2) providing a first base plate, coating a black matrix material on the first base plate, and subjecting the black matrix material to a patterning operation to form a black matrix, wherein the first base plate and the black matrix collectively delimit a plurality of pixel cavities;
   (3) forming a common electrode on and completely covering the black matrix, the plurality of pixel cavities, and the first base plate; and dropping the PDLC and graphene mixture into the plurality of pixel cavities at predetermined sites to form a PDLC substrate;
   (4) providing a second base plate and forming, in sequence, a thin-film transistor (TFT) layer and a pixel electrode on the second base plate to form an array substrate, wherein the pixel electrode layer comprises a plurality of pixel electrodes respectively corresponding to the plurality of pixel cavities;
   (5) coating first enclosure resin along a circumference of the PDLC substrate or the array substrate and conducting vacuum lamination of the PDLC substrate and the array substrate;
   (6) providing a third base plate and forming a plurality of pixel patterns on the base plate to respectively correspond to the plurality of pixel cavities, wherein the plurality of pixel patterns comprises red pixel patterns, green pixel patterns, and transparent pixel patterns; the red pixel patterns is formed of a material comprising a mixture of red quantum dots (QDs) and a transparent photoresist material; the green pixel patterns is formed of a material comprising a mixture of green QDs and a transparent photoresist material; and the transparent pixel patterns includes no material provided thereon, so as to form a QD substrate, wherein the red pixel patterns and the green pixel patterns, when excited by blue light, emit red light and green light respectively and the transparent pixel patterns allow blue light to transmit therethrough to display a blue color;
   (7) coating second enclosure resin along a circumference of the array substrate or the QD substrate and conducting lamination of the array substrate and the QD substrate such that the PDLC substrate, the array substrate, and the QD substrate collectively form a PDLC display panel; and
   (8) providing a backlight module and combining the PDLC display panel and the backlight module together to form a PDLC display device, wherein the backlight module emits blue light.

2. The method for manufacturing a PDLC display device as claimed in claim 1, wherein in step (1), the PDLC and the graphene nanoparticles are mixed through mechanical stirring.

3. The method for manufacturing a PDLC display device as claimed in claim 1, wherein in step (1), the graphene nanoparticles are formed through one of mechanical exfoliation, oxidation-reduction operation, silicon carbide epitaxial growth, and chemical vapor deposition; and the graphene nanoparticles have a particle size in the range of 0 nm-80 nm.

4. The method for manufacturing a PDLC display device as claimed in claim 1, wherein in step (1), the graphene nanoparticles and the PDLC are mixed at a mass ratio of 0.1-5:100.

5. The method for manufacturing a PDLC display device as claimed in claim 1, wherein the common electrode and the pixel electrode are both transparent electrodes; and the first base plate, the second base plate, and the third base plate are all transparent plates.

6. The method for manufacturing a PDLC display device as claimed in claim 1, wherein the first enclosure resin and the second enclosure resin contain therein spacing materials for maintaining a spacing distance between upper and lower substrates.

7. The method for manufacturing a PDLC display device as claimed in claim 1, wherein in step (6), a process for forming the red pixel patterns and the green pixel patterns is that the transparent photoresist material that is mixed with the QDs is coated on the third base plate, followed by operations of drying, exposure, development, and etching, wherein the QDs and the transparent photoresist material are mixed at a ratio of 5-10:100.

8. A polymer dispersed liquid crystal (PDLC) display device, comprising a PDLC display panel and a backlight module arranged below the PDLC display panel;
   wherein the PDLC display panel comprises a PDLC substrate, an array substrate arranged below the PDLC substrate, and a quantum dot (QD) substrate arranged below the array substrate;
   the PDLC substrate comprises a first base plate, a black matrix arranged on the first base plate, a common electrode arranged on the black matrix and the first base plate, a PDLC and graphene mixture; the black matrix and the first base plate collectively delimit a plurality of pixel cavities, and the plurality of pixel cavities is filled with the PDLC and graphene mixture;
   the array substrate comprises a second base plate, a thin-film transistor (TFT) layer arranged on the second base plate, and a pixel electrode layer arranged on the TFT layer; and the pixel electrode layer comprises a plurality of pixel electrodes respectively corresponding to the plurality of pixel cavities;
   the QD substrate comprises a third base plate, a plurality of pixel patterns arranged on the third base plate and respectively corresponding to the plurality of pixel cavities, wherein the plurality of pixel patterns comprises red pixel patterns, green pixel patterns, and transparent pixel patterns; the red pixel patterns is formed of a material comprising a mixture of red QDs and a transparent photoresist material; the green pixel patterns is formed of a material comprising a mixture of green QDs and a transparent photoresist material; and the transparent pixel patterns includes no material provided thereon; and
   the backlight module emits blue light; and the red pixel patterns and the green pixel pattern are excitable by blue light to emit red light and green light respectively and the transparent pixel patterns allows blue light to transmit therethrough to thereby display a blue color.

9. The PDLC display device as claimed in claim 8, wherein the common electrode and the pixel electrode are both transparent electrodes.

10. The PDLC display device as claimed in claim 8, wherein the first base plate, the second base plate, and the third base plate are transparent plates.

11. A method for manufacturing a polymer dispersed liquid crystal (PDLC) display device, comprising the following steps:
   (1) providing PDLC and graphene nanoparticles and mixing the graphene nanoparticles and the PDLC at a mass ratio of 0.1-20:100, followed by uniform stirring to obtain a PDLC and graphene mixture;
   (2) providing a first base plate, coating a black matrix material on the first base plate, and subjecting the black matrix material to a patterning operation to form a black matrix, wherein the first base plate and the black matrix collectively delimit a plurality of pixel cavities;
   (3) forming a common electrode on and completely covering the black matrix, the plurality of pixel cavities, and the first base plate; and dropping the PDLC and graphene mixture into the plurality of pixel cavities at predetermined sites to form a PDLC substrate;
   (4) providing a second base plate and forming, in sequence, a thin-film transistor (TFT) layer and a pixel electrode on the second base plate to form an array substrate, wherein the pixel electrode layer comprises a plurality of pixel electrodes respectively corresponding to the plurality of pixel cavities;
   (5) coating first enclosure resin along a circumference of the PDLC substrate or the array substrate and conducting vacuum lamination of the PDLC substrate and the array substrate;
   (6) providing a third base plate and forming a plurality of pixel patterns on the base plate to respectively correspond to the plurality of pixel cavities, wherein the plurality of pixel patterns comprises red pixel patterns, green pixel patterns, and transparent pixel patterns; the red pixel patterns is formed of a material comprising a mixture of red quantum dots (QDs) and a transparent photoresist material; the green pixel patterns is formed of a material comprising a mixture of green QDs and a transparent photoresist material; and the transparent pixel patterns includes no material provided thereon, so as to form a QD substrate, wherein the red pixel patterns and the green pixel patterns, when excited by blue light, emit red light and green light respectively and the transparent pixel patterns allow blue light to transmit therethrough to display a blue color;
   (7) coating second enclosure resin along a circumference of the array substrate or the QD substrate and conducting lamination of the array substrate and the QD substrate such that the PDLC substrate, the array substrate, and the QD substrate collectively form a PDLC display panel; and
   (8) providing a backlight module and combining the PDLC display panel and the backlight module together to form a PDLC display device, wherein the backlight module emits blue light;
   wherein in step (1), the PDLC and the graphene nanoparticles are mixed through mechanical stirring;
   wherein in step (1), the graphene nanoparticles are formed through one of mechanical exfoliation, oxidation-reduction operation, silicon carbide epitaxial growth, and chemical vapor deposition; and the graphene nanoparticles have a particle size in the range of 0 nm-80 nm; and
   wherein in step (1), the graphene nanoparticles and the PDLC are mixed at a mass ratio of 0.1-5:100.

12. The method for manufacturing a PDLC display device as claimed in claim 11, wherein the common electrode and the pixel electrode are both transparent electrodes; and the first base plate, the second base plate, and the third base plate are all transparent plates.

13. The method for manufacturing a PDLC display device as claimed in claim 11, wherein the first enclosure resin and the second enclosure resin contain therein spacing materials for maintaining a spacing distance between upper and lower substrates.

14. The method for manufacturing a PDLC display device as claimed in claim 11, wherein in step (6), a process for forming the red pixel patterns and the green pixel patterns is that the transparent photoresist material that is mixed with the QDs is coated on the third base plate, followed by operations of drying, exposure, development, and etching, wherein the QDs and the transparent photoresist material are mixed at a ratio of 5-10:100.

* * * * *